United States Patent
Doron

(10) Patent No.: US 11,728,678 B2
(45) Date of Patent: Aug. 15, 2023

(54) SYSTEMS AND METHODS FOR REGULATING A POWER DRAW FROM AN INDUCTION POWER HARVESTER (IPH)

(71) Applicant: Connected Intelligence Systems Ltd., Netanya (IL)

(72) Inventor: Eyal Doron, Netanya (IL)

(73) Assignee: Connected Intelligence Systems Ltd., Netanya (IL)

(*) Notice: Subject to any disclaimer, the term of this patent is extended or adjusted under 35 U.S.C. 154(b) by 289 days.

(21) Appl. No.: 17/419,543

(22) PCT Filed: Nov. 10, 2019

(86) PCT No.: PCT/IL2019/051224
§ 371 (c)(1),
(2) Date: Jun. 29, 2021

(87) PCT Pub. No.: WO2020/141501
PCT Pub. Date: Jul. 9, 2020

(65) Prior Publication Data
US 2022/0077715 A1  Mar. 10, 2022

(30) Foreign Application Priority Data
Dec. 31, 2018  (IL) ........................................ 264042

(51) Int. Cl.
*H02M 3/156* (2006.01)
*H02J 50/00* (2016.01)
(Continued)

(52) U.S. Cl.
CPC ............ *H02J 50/001* (2020.01); *H02J 50/10* (2016.02); *H02M 1/0025* (2021.05); *H02M 3/156* (2013.01); *H02M 7/217* (2013.01)

(58) Field of Classification Search
CPC .. H02M 1/12; H02M 3/3155; H02M 3/33507; H02M 3/33546; H02M 7/1557;
(Continued)

(56) References Cited

U.S. PATENT DOCUMENTS

| 4,048,605 A | 9/1977 | McCollum |
| 4,336,520 A | 6/1982 | Trayer |

(Continued)

FOREIGN PATENT DOCUMENTS

| CN | 105958461 A | 9/2016 |
| KR | 20140009622 A | 1/2014 |

OTHER PUBLICATIONS

"Energy Harvesting Ellectornics for Vibratory .3 Devices in Self-Powered Sensors", By: Chao P., IEEE Sensors Journal, vol. 11, No. 12, Dec. 2011.

(Continued)

*Primary Examiner* — Jeffrey A Gblende

(57) ABSTRACT

A method for regulating input impedance of a switching regulator, the method comprising: obtaining, at an impedance controller: (a) a measured voltage value that is indicative of an input current of the switching regulator and (b) an input voltage of the switching regulator, wherein a ratio of the input voltage to the input current defines an actual input impedance of the switching regulator; generating a control signal by the impedance controller, in accordance with a difference between the actual input impedance of the switching regulator and a desired input impedance of the switching regulator, wherein the desired input impedance is a predefined impedance; and controlling a feedback node feeding the switching regulator, in accordance with the control signal, to realize an output voltage of the switching regulator for achieving the desired input impedance, wherein the feedback node is external to the switching regulator, thereby (Continued)

regulating the input impedance of the switching regulator externally to the switching regulator.

20 Claims, 7 Drawing Sheets

(51) Int. Cl.
*H02J 50/10* (2016.01)
*H02M 1/00* (2006.01)
*H02M 7/217* (2006.01)

(58) Field of Classification Search
CPC ............ H02M 7/1626; H02M 1/4208; H02M 7/53871; H02M 7/12; H02M 7/219; H02M 7/151; H02M 1/4233; H02M 5/4585; H02M 7/217; H02M 7/218; H02M 1/08; H02M 7/1552; H02M 7/15557; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 1/0025; G05F 1/30; G05F 1/33; G05F 1/32; G05F 1/34; G05F 1/38; G05F 1/52; H02J 50/10; H02J 20/001
See application file for complete search history.

(56) References Cited

U.S. PATENT DOCUMENTS

| | | | |
|---|---|---|---|
| 4,442,417 A | 4/1984 | Symons | |
| 6,462,924 B1 * | 10/2002 | Watanabe | H02M 7/217 |
| | | | 361/91.2 |
| 6,756,776 B2 | 6/2004 | Perkinson et al. | |
| 8,338,991 B2 | 12/2012 | Von Novak et al. | |
| 8,451,038 B2 | 5/2013 | Karlsson et al. | |
| 8,675,898 B2 * | 3/2014 | Akino | H04R 3/007 |
| | | | 381/176 |
| 8,953,349 B2 * | 2/2015 | Divan | H02M 7/12 |
| | | | 363/127 |
| 9,419,532 B2 * | 8/2016 | Hirano | H02M 3/33576 |
| 9,753,469 B2 | 9/2017 | McCollough | |
| 9,984,818 B2 | 5/2018 | Rumrill | |
| 2012/0250205 A1 | 10/2012 | Pfitzer et al. | |
| 2012/0293021 A1 | 11/2012 | Teggatz et al. | |
| 2014/0160820 A1 | 6/2014 | McKinley | |
| 2015/0244341 A1 | 8/2015 | Ritter et al. | |
| 2015/0333509 A1 | 11/2015 | Jankowski | |
| 2017/0162320 A1 | 6/2017 | Rumrill | |
| 2017/0179732 A1 | 6/2017 | Hoeppner | |
| 2017/0182895 A1 | 6/2017 | Fischperer et al. | |
| 2017/0199533 A1 | 7/2017 | McCollough | |
| 2017/0351280 A1 | 12/2017 | Fernandez et al. | |

OTHER PUBLICATIONS

"Power Management Circuit Design for .4 Vibration Energy Harvesting From Freight Railcars", By: Thomas Joseph O'Connor, May 4, 2015.

"Peak-Current-Mode-Controlled Buck Converter With Positive Feedforward Control", By: Hyoung T. Cho, et al.

"Power Line Induction Energy Harvesting Powering Small Sensor Nodes", By: Oskar Thorin.

"A High Efficient Micro-Controlled Buck Converter With Maximum Power Point Tracking for Photovoltaic Systems", By: Bernardo, et al., Apr. 15-17, 2009.

* cited by examiner

SYSTEMS AND METHODS FOR REGULATING A POWER DRAW FROM AN INDUCTION POWER HARVESTER (IPH)

TECHNICAL FIELD

The invention relates to systems and methods for regulating a power draw from an Induction Power Harvester (IPH).

BACKGROUND

An Induction Power Harvester (IPH) can capture energy from an alternating current (AC) high power line (e.g. an underground Medium Voltage (MV) distribution line or an overhead high voltage transmission line) to power one or more electronic devices (e.g., a power quality monitor fitted on the line) without directly tapping into the high power line. An IPH that captures energy from an AC high power line typically includes a split ferromagnetic core with a toroidal (i.e., ring or donut) shape, and one or more windings (i.e., coils) wound around the core. When the IPH is mounted on a high power line carrying a current, a time-varying magnetic field surrounding the high power line threads the windings wound around the core. An AC power signal can be thereby generated across terminals of a winding of the windings for extraction by an extraction circuit. The extraction circuit supplies energy for powering the electronic devices, in accordance with the energy generated by the IPH.

The extraction circuit must be capable of supplying several watts of power for powering the electronic devices even when low line currents (e.g., 20 A or less) flow through the AC power line. An object of the present disclosure is to design an extraction circuit that increases the power draw from the IPH at low line currents.

Moreover, it is necessary to prevent the extraction circuit from drawing power from the IPH when certain conditions are met, such as when high line currents (e.g., hundreds of amperes) flow through the AC power line. A power supply controller for powering the electronic devices draws only as much current from the IPH as it requires, thus presenting a high impedance to the IPH when high line currents flow through the AC power line. This can cause the IPH voltage to increase up to the open circuit electromotive force (EMF), which can be very high for high line currents. In the absence of a system for preventing the extraction circuit from drawing power from the IPH, the entire power path, including the wiring, connectors and the extraction circuit itself, would have to be designed to withstand the open circuit EMF of the IPH, thus greatly increasing the complexity and cost of capturing energy using the IPH.

It is known in the art to clamp the IPH voltage by passing excess current generated by the IPH through a resistive load. However, the resistive load dissipates the excess energy, which can reach tens or hundreds of watts of power, in the form of heat. This again greatly increases the complexity and cost of capturing energy using the IPH.

In view of the foregoing, an object of the present disclosure is to design a system that is capable of preventing the extraction circuit from drawing power from the IPH when certain conditions are met, while dissipating little power.

In addition, there is a need in the art to ensure that the IPH is installed on the AC power line safely and at low cost. The core of the IPH is a split core that is fitted around the AC power line. When the two halves of the core are brought close together, a magnetic flux through the core increases rapidly, resulting in a large attractive force that draws the two halves of the core together. Accordingly, the two halves will snap together in a manner that can be very awkward, not to mention dangerous, to the installer of the IPH. Moreover, the increased magnetic flux through the core when the two halves of the core are brought together can result in a voltage spike at electrical contacts of a winding of the core, which can reach or exceed a value of hundreds of volts. This voltage spike can be dangerous to the installer. Even if the electrical contacts are covered during installation of the IPH, the existence of the voltage spike requires the connectors and wiring to be specified to withstand high voltages, which raises the size and cost of the IPH.

In view of the foregoing, an object of the present disclosure is to install the IPH safely and at low cost.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,338,991 (Von Novak et al.), published on Dec. 25, 2012, is directed to wireless power. A wireless power receiver includes a receive antenna for coupling with near field radiation in a coupling-mode region generated by a transmit antenna operating at a resonant frequency. The receive antenna generates an RF signal when coupled to the near field radiation and a rectifier converts the RF signal to a DC input signal. A direct current-to-direct current (DC-to-DC) converter coupled to the DC input signal generates a DC output signal. A pulse modulator generates a pulse-width modulation signal to the DC-to-DC converter to adjust a DC impedance of the wireless power receiver by modifying a duty cycle of the pulse-width modulation signal responsive to at least one of a voltage of the DC input signal, a current of the DC input signal, a voltage of the DC output signal, and a current of the DC output signal.

U.S. Patent Application Publication No. 2017/0179732 (Hoeppner et al.), published on Jun. 22, 2017, discloses an energy harvesting system that can include an electrical conductor through which primary power flows. The system can also include an instrument transformer disposed around the electrical conductor, where the instrument transformer includes a secondary inductor, where the instrument transformer creates a first transformed power through the secondary inductor using the first power. The system can also include at least one tuning capacitor electrically coupled in parallel to the secondary inductor. The system can further include at least one switch coupled in series with the at least one tuning capacitor, where the at least one switch has an open position and a closed position. The system can also include an electrical load electrically coupled to the secondary inductor and the at least one switch, where the at least one tuning capacitor modifies the first transformed power when the at least one switch is in the closed position.

U.S. Patent Application Publication No. 2015/0333509 (Jankowski), published on Nov. 19, 2015, discloses a protective circuit for a current transformer for preventing a secondary voltage on a secondary circuit of the current transformer from exceeding a secondary voltage threshold. A protective circuit input can be coupled to the secondary circuit of the current transformer such that the secondary voltage is applied to the protective circuit input. A control unit is connected to the protective circuit input. A switch unit is connected to the protective circuit input and is operatively connected to the control unit. The control unit is adapted to provide a control signal to the switch unit in response to the secondary voltage exceeding the secondary voltage threshold. The switch unit is adapted to short-circuit the protective circuit input in response to the control signal provided by the control unit. The switch unit is implemented as a semiconductor circuit.

U.S. Pat. No. 9,984,818 (Rumrill), published on May 29, 2018, provides a power distribution monitoring system that can include a number of features. The system can include a plurality of monitoring devices configured to attach to individual conductors on a power grid distribution network. In some embodiments, a monitoring device is disposed on each conductor of a three-phase network and utilizes a split-core transformer to harvest energy from the conductors. The monitoring devices can be configured to harvest energy from the AC power grid and saturate the magnetic core of the transformer in the event of a fault condition or when harvested power is not needed. Methods of installing and using the monitoring devices are also provided.

U.S. Pat. No. 6,756,776 (Perkinson et al.), published on Jun. 29, 2004, discloses a current transformer to be installed around a current-carrying conductor. The transformer has a split core with two parts, which can be opened to allow the transformer to be installed around or removed from the current-carrying conductor. A winding wound on the core is operatively connected to a switch so that the winding can be shorted prior to opening the split core when the transformer is removed from the current-carrying conductor in order to reduce the magnetic force holding the split core parts together. The winding is shorted by the switch prior to closing the split core parts when the transformer is installed around the conductor in order to minimize the damage to the core due to the induced magnetic force thereon. A mechanical tool is used to open or close the split-core parts. The switch can be linked to the tool for shorting and opening the winding.

GENERAL DESCRIPTION

In accordance with a first aspect of the presently disclosed subject matter, there is provided a method for regulating input impedance of a switching regulator, the method comprising: obtaining, at an impedance controller: (a) a measured voltage value that is indicative of an input current of the switching regulator and (b) an input voltage of the switching regulator, wherein a ratio of the input voltage to the input current defines an actual input impedance of the switching regulator; generating a control signal by the impedance controller, in accordance with a difference between the actual input impedance of the switching regulator and a desired input impedance of the switching regulator, wherein the desired input impedance is a predefined impedance; and controlling a feedback node feeding the switching regulator, in accordance with the control signal, to realize an output voltage of the switching regulator for achieving the desired input impedance, wherein the feedback node is external to the switching regulator, thereby regulating the input impedance of the switching regulator externally to the switching regulator.

In some cases, controlling the feedback node feeding the switching regulator comprises: routing an additional current into the feedback node, in accordance with the control signal.

In some cases, controlling the feedback node feeding the switching regulator comprises: adjusting a voltage divider connected to the feedback node, in accordance with the control signal.

In some cases, the switching regulator is included in an extraction circuit that is configured to extract power from a power harvester.

In some cases, the power harvester is an Induction Power Harvester (IPH).

In some cases, the desired input impedance is predefined to maximize a power draw from the power harvester.

In some cases, the method further comprises dynamically adjusting the desired input impedance to maximize the power draw from the power harvester.

In accordance with a second aspect of the presently disclosed subject matter, there is provided a method for limiting supply of energy from an Induction Power Harvester (IPH), the IPH being configured to provide energy for an electrical load, the method comprising: converting an alternating (AC) power signal that is generated across first and second terminals of a first winding of the IPH to a direct (DC) input signal, using an AC-to-DC converter, the AC-to-DC converter being connected to the first and second terminals; and generating a short circuit across third and fourth terminals of the IPH, using a shorting switch, thereby limiting the supply of energy from the IPH; wherein at least one of the first or second terminals is connected to the AC-to-DC converter and not connected to the shorting switch, thereby enabling a reduced current through the shorting switch, relative to an alternative configuration in which the first and second terminals are connected to the AC-to-DC converter and to the shorting switch.

In some cases, the short circuit is generated in response to the DC input signal being greater than or equal to a first threshold.

In some cases, the DC input signal is a DC voltage input signal.

In some cases, the method further comprises: removing the short circuit across the third and fourth terminals, in response to the DC input signal dropping below a second threshold, the second threshold being less than or equal to the first threshold, thereby enabling the supply of energy from the IPH to be resumed.

In some cases, the first threshold and the second threshold are fixed.

In some cases, at least one of the first threshold or the second threshold is variable.

In some cases, the method further comprises: converting the DC input signal to a storage signal, using a DC-to-DC converter, the storage signal being applied to at least one of: (a) an energy storage bank that is configured to store energy for powering the electrical load in accordance with the storage signal or (b) the electrical load; wherein the at least one of the first threshold or the second threshold is varied in accordance with one or more of: a voltage level of the storage signal, a charge level of the energy storage bank, or power requirements of the electrical load.

In some cases, the method further comprises: converting the DC input signal to a storage signal, using a DC-to-DC converter, the storage signal being applied to an energy storage bank that is configured to store energy for powering the electrical load in accordance with the storage signal, wherein the short circuit is generated in response to a voltage level of the storage signal being greater than or equal to a third voltage or a charge level of the energy storage bank being greater than or equal to a first charge level.

In some cases, the method further comprises: removing the short circuit across the third and fourth terminals, in response to the voltage level of the storage signal dropping below a fourth threshold or a charge level of the energy storage bank dropping below a second charge level, the fourth threshold being less than or equal to the third threshold and the second charge level being less than or equal to the first charge level, thereby enabling the supply of energy from the IPH to be resumed.

In some cases, the shorting switch is a power Triode for Alternating Current (TRIAC).

In some cases, the shorting switch is connected to a first tap of the first winding, such that the short circuit is generated across third and fourth terminals of the first winding, and the AC-to-DC converter is connected to a second tap of the first winding, the first tap including a larger number of turns of the first winding than the second tap, thereby enabling the reduced current through the shorting switch.

In some cases, the shorting switch is connected to a second winding of the IPH, different than the first winding, such that the short circuit is generated across third and fourth terminals of the second winding, thereby enabling the reduced current through the shorting switch.

In accordance with a third aspect of the presently disclosed subject matter, there is provided a method for physically installing an Induction Power Harvester (IPH) on a live alternating current (AC) power line, the method comprising: providing (A) the IPH including: (a) a split core, and (b) one or more power windings wound around the core, (B) a power Triode for Alternating Current (TRIAC) connected across terminals of a given winding of the windings, and (C) a controller connected to the power TRIAC; enabling a current flow through the power TRIAC, using the controller; installing the IPH and the power TRIAC on the live AC power line, wherein the power TRIAC shorts the terminals of the given winding upon an accumulation of a turn-on voltage on a gate electrode of the power TRIAC, thereby nullifying a magnetic flux through the core; and disabling the current flow through the power TRIAC upon a zero crossing point of the current through the given winding, using the controller, thereby enabling the IPH to provide energy for an electrical load.

In some cases, the controller is a manual switch that is connected between an anode electrode and a gate electrode of the power TRIAC, wherein the switch is closed prior to installing the IPH and the power TRIAC on the live power line to enable the current flow through the power TRIAC.

In some cases, the switch is opened to disable the current flow through the power TRIAC.

In some cases, the controller is an electrical connector that includes a first pin electrically connected to an anode electrode of the power TRIAC and a second pin electrically connected to a gate electrode of the power TRIAC, the first pin and the second pin being shorted together prior to installing the IPH and the power TRIAC on the live power line to enable the current flow through the power TRIAC.

In some cases, the short between the first pin and the second pin is removed to disable the current flow through the power TRIAC.

In some cases, the controller is a reed switch that is connected between an anode electrode and a gate electrode of the power TRIAC, wherein the reed switch is closed prior to installing the IPH and the power TRIAC on the live power line to enable the current flow through the power TRIAC.

In some cases, the reed switch is opened to disable the current flow through the power TRIAC.

In some cases, the method further comprises: detecting a connection of the electrical load; wherein the disabling of the current flow is performed in response to the detecting of the connection of the electrical load.

In accordance with a fourth aspect of the presently disclosed subject matter, there is provided a system for regulating input impedance of a switching regulator, the system comprising: a digital impedance controller configured to obtain: (a) a measured voltage value that is indicative of an input current of the switching regulator and (b) an input voltage of the switching regulator, wherein a ratio of the input voltage to the input current defines an actual input impedance of the switching regulator; and to generate a control signal, in accordance with a difference between the actual input impedance of the switching regulator and a desired input impedance of the switching regulator, wherein the desired input impedance is a predefined impedance; and a feedback node controller configured to control a feedback node feeding the switching regulator, in accordance with the control signal, to realize an output voltage of the switching regulator for achieving the desired input impedance, wherein the feedback node is external to the switching regulator, thereby regulating the input impedance of the switching regulator externally to the switching regulator.

In some cases, the feedback node controller is configured to control the feedback node by routing an additional current into the feedback node, in accordance with the control signal.

In some cases, the feedback node controller is configured to control the feedback node by adjusting a voltage divider connected to the feedback node, in accordance with the control signal.

In some cases, the switching regulator is included in an extraction circuit that is configured to extract power from a power harvester.

In some cases, the power harvester is an Induction Power Harvester (IPH).

In some cases, the desired input impedance is predefined to maximize a power draw from the power harvester.

In some cases, the digital impedance controller is further configured to dynamically adjust the desired input impedance to maximize the power draw from the power harvester.

In accordance with a fifth aspect of the presently disclosed subject matter, there is provided a system for limiting supply of energy from an Induction Power Harvester (IPH), the IPH being configured to provide energy for an electrical load, the system comprising: an AC-to-DC converter configured to convert an alternating (AC) power signal that is generated across first and second terminals of a first winding of the IPH to a direct (DC) input signal, the AC-to-DC converter being connected to the first and second terminals; wherein the system is configured to generate a short circuit across third and fourth terminals of the IPH, using a shorting switch, thereby limiting the supply of energy from the IPH; and wherein at least one of the first or second terminals is connected to the AC-to-DC converter and not connected to the shorting switch, thereby enabling a reduced current through the shorting switch, relative to an alternative configuration in which the first and second terminals are connected to the AC-to-DC converter and to the shorting switch.

In some cases, the system is configured to generate the short circuit in response to the DC input signal being greater than or equal to a first threshold.

In some cases, the DC input signal is a DC voltage input signal.

In some cases, the system is configured to remove the short circuit across the third and fourth terminals, in response to the DC input signal dropping below a second threshold, the second threshold being less than or equal to the first threshold, thereby enabling the supply of energy from the IPH to be resumed.

In some cases, the first threshold and the second threshold are fixed.

In some cases, at least one of the first threshold or the second threshold is variable.

In some cases, the system further comprises: a DC-to-DC converter configured to convert the DC input signal to a storage signal, the storage signal being applied to at least one of: (a) an energy storage bank that is configured to store energy for powering the electrical load in accordance with the storage signal or (b) the electrical load; wherein the at least one of the first threshold or the second threshold is varied in accordance with one or more of: a voltage level of the storage signal, a charge level of the energy storage bank, or power requirements of the electrical load.

In some cases, the system further comprises: a DC-to-DC converter configured to convert the DC input signal to a storage signal, the storage signal being applied to an energy storage bank that is configured to store energy for powering the electrical load in accordance with the storage signal, wherein the system is configured to generate the short circuit in response to a voltage level of the storage signal being greater than or equal to a third voltage or a charge level of the energy storage bank being greater than or equal to a first charge level.

In some cases, the system is configured to remove the short circuit across the third and fourth terminals, in response to the voltage level of the storage signal dropping below a fourth threshold or a charge level of the energy storage bank dropping below a second charge level, the fourth threshold being less than or equal to the third threshold and the second charge level being less than or equal to the first charge level, thereby enabling the supply of energy from the IPH to be resumed.

In some cases, the shorting switch is a power Triode for Alternating Current (TRIAC).

In some cases, the shorting switch is connected to a first tap of the first winding, such that the short circuit is generated across third and fourth terminals of the first winding, and the AC-to-DC converter is connected to a second tap of the first winding, the first tap including a larger number of turns of the first winding than the second tap, thereby enabling the reduced current through the shorting switch.

In some cases, the shorting switch is connected to a second winding of the IPH, different than the first winding, such that the short circuit is generated across third and fourth terminals of the second winding, thereby enabling the reduced current through the shorting switch.

In accordance with a sixth aspect of the presently disclosed subject matter, there is provided a system for physically installing an Induction Power Harvester (IPH) on a live alternating current (AC) power line, the system comprising: the IPH including: (a) a split core, and (b) one or more windings wound around the core; a power Triode for Alternating Current (TRIAC) connected across terminals of a given winding of the windings; and a controller connected to the power TRIAC, the controller being configured to enable a current flow through the power TRIAC; wherein the power TRIAC is configured to short the terminals of the given winding upon an accumulation of a turn-on voltage on a gate electrode of the power TRIAC during an installation of the IPH and the power TRIAC on the live AC power line, thereby nullifying a magnetic flux through the core; and wherein the controller is configured to disable the current flow through the power TRIAC upon a zero crossing point of the current through the given winding, thereby enabling the IPH to provide energy for an electrical load.

In some cases, the controller is a manual switch that is connected between an anode electrode and a gate electrode of the power TRIAC, wherein the switch is closed prior to installing the IPH and the power TRIAC on the live power line to enable the current flow through the power TRIAC.

In some cases, the switch is opened to disable the current flow through the power TRIAC.

In some cases, the controller is an electrical connector that includes a first pin electrically connected to an anode electrode of the power TRIAC and a second pin electrically connected to a gate electrode of the power TRIAC, the first pin and the second pin being shorted together prior to installing the IPH and the power TRIAC on the live power line to enable the current flow through the power TRIAC.

In some cases, the short between the first pin and the second pin is removed to disable the current flow through the power TRIAC.

In some cases, the controller is a reed switch that is connected between an anode electrode and a gate electrode of the power TRIAC, wherein the reed switch is closed prior to installing the IPH and the power TRIAC on the live power line to enable the current flow through the power TRIAC.

In some cases, the reed switch is opened to disable the current flow through the power TRIAC.

In some cases, the controller is configured to disable the current flow through the power TRIAC upon detecting a connection of the electrical load.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
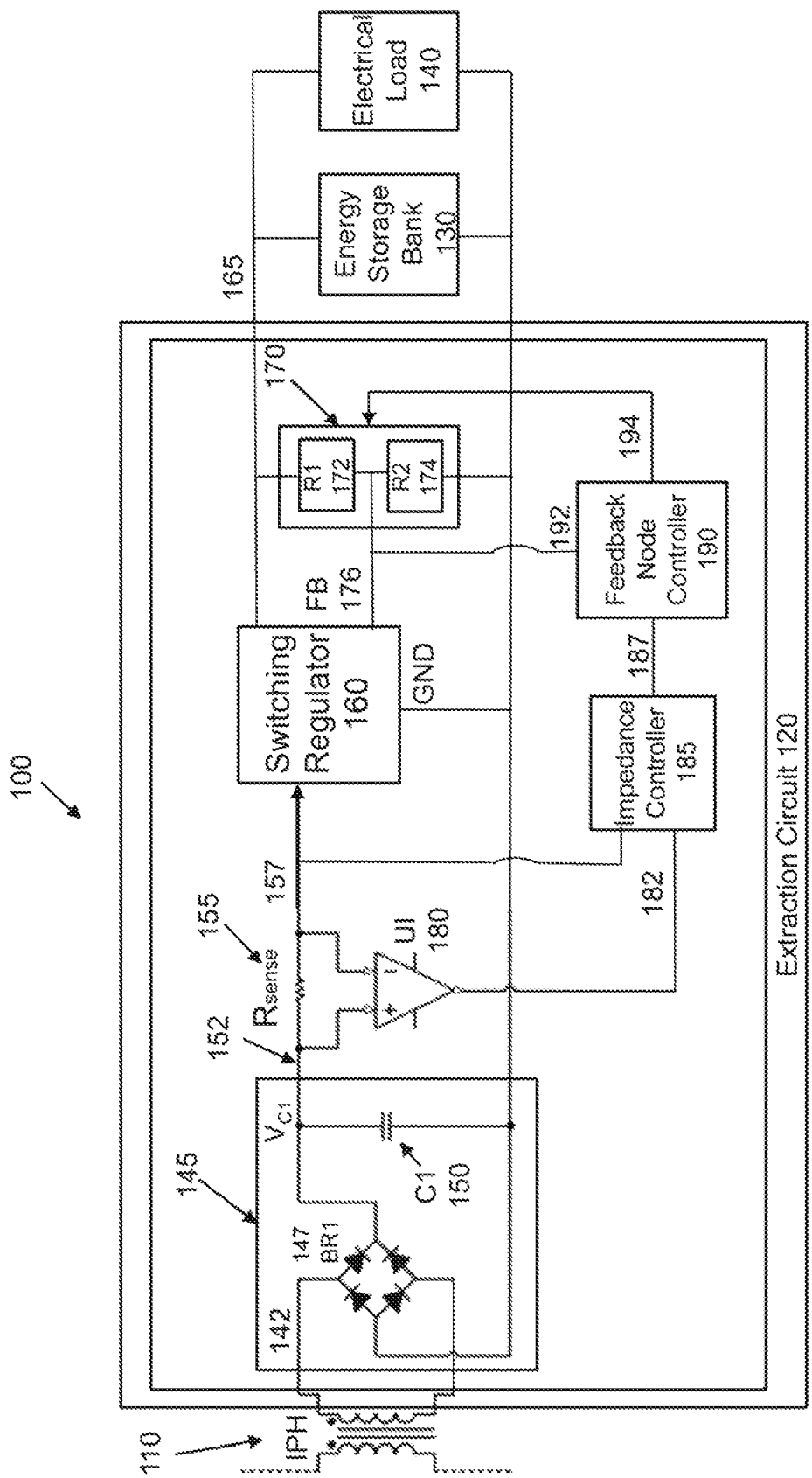
FIG. 1 is a block diagram that schematically illustrates an example of an inductive power harvesting system for increasing a power draw from an Induction Power Harvester (IPH), in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "generating". "controlling", "routing", "adjusting", "converting", "limiting", "removing", "enabling", "providing", "installing", "disabling". "detecting" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
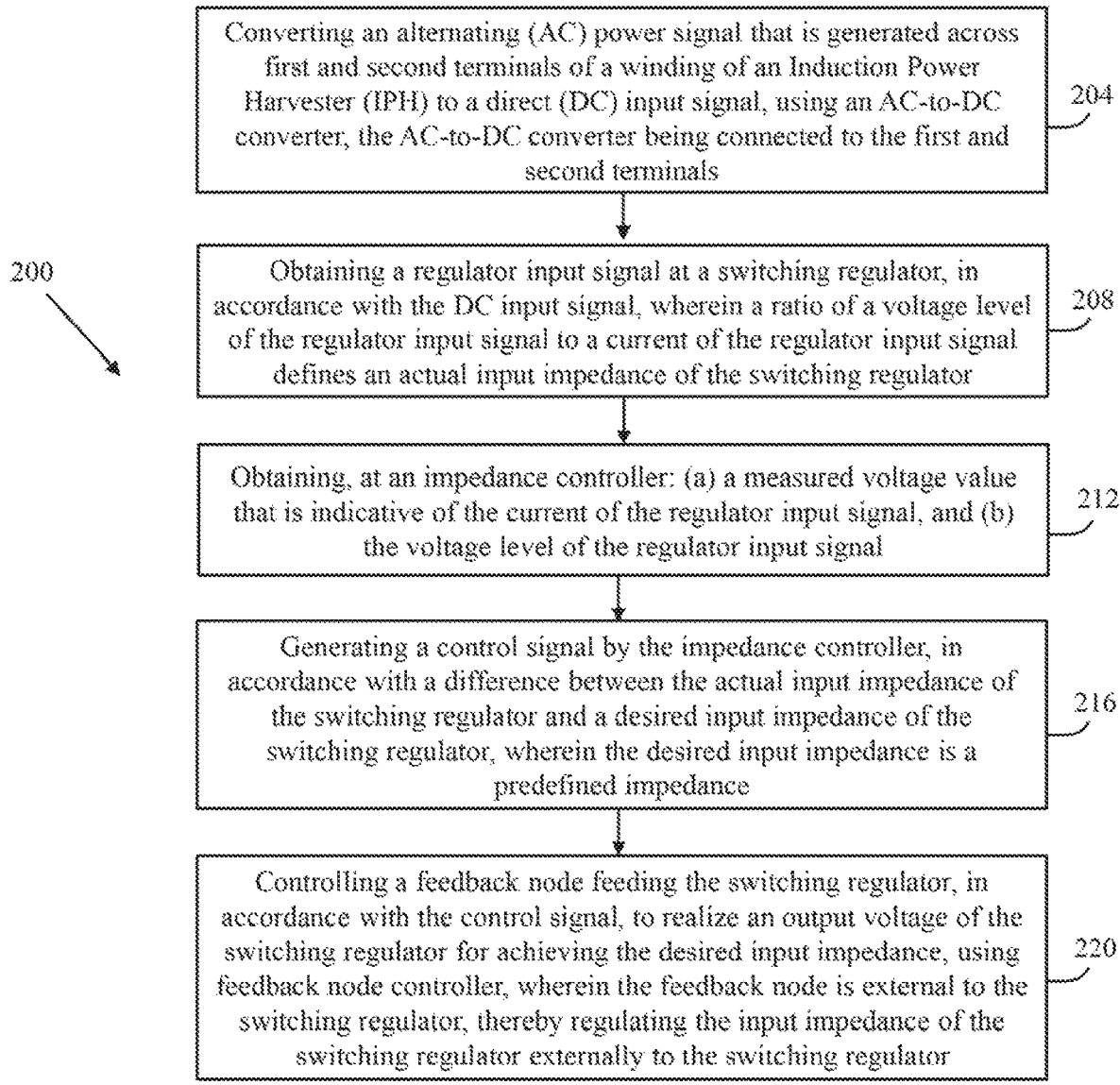
FIG. 2 is a flowchart illustrating an example of a method for increasing a power draw from an IPH, in accordance with the presently disclosed subject matter.
Figure 3:
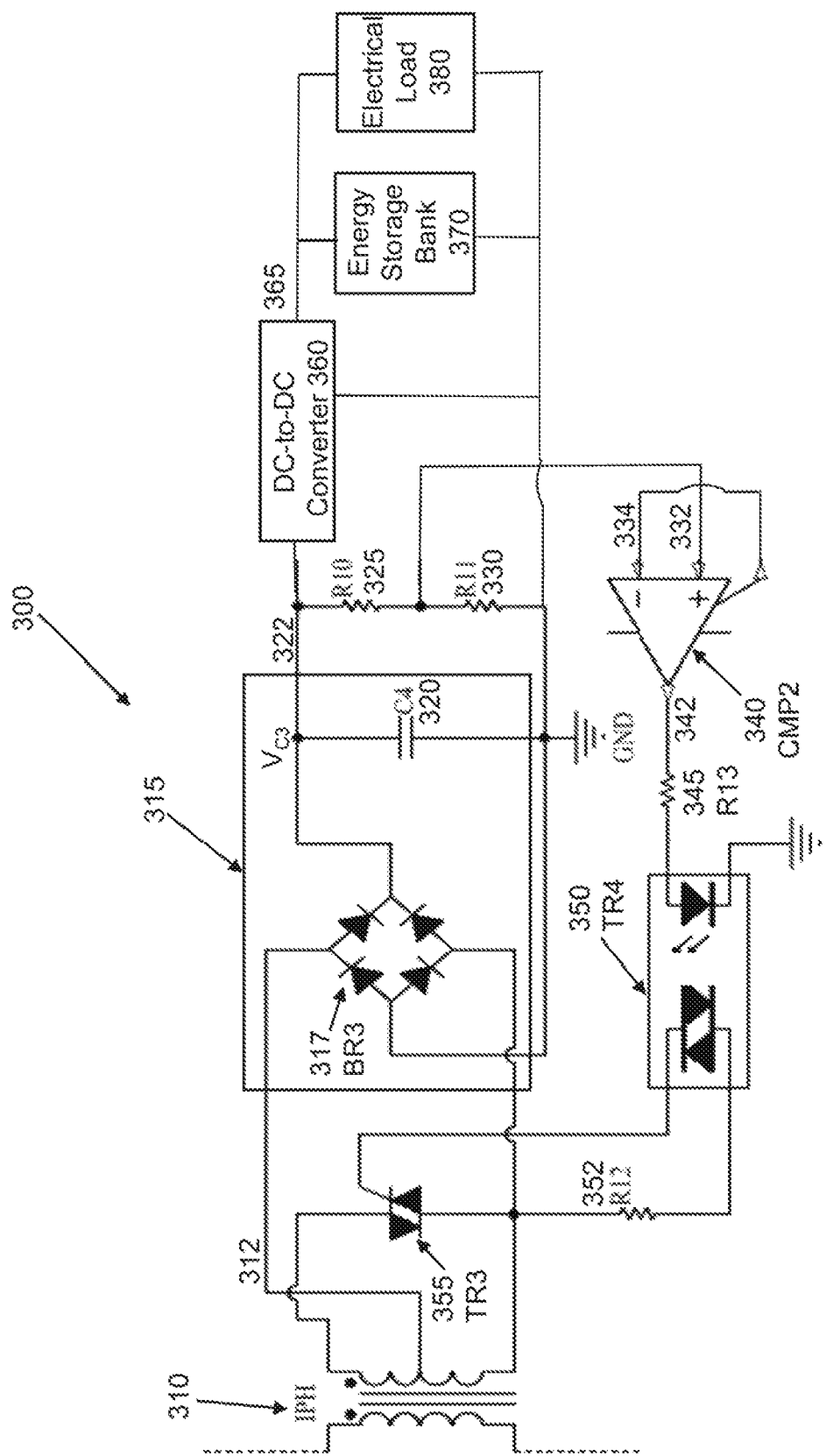
FIG. 3 is a block diagram schematically illustrating an example of an inductive power harvesting system for limiting a supply of energy from an IPH, in accordance with the presently disclosed subject matter.
Figure 4:
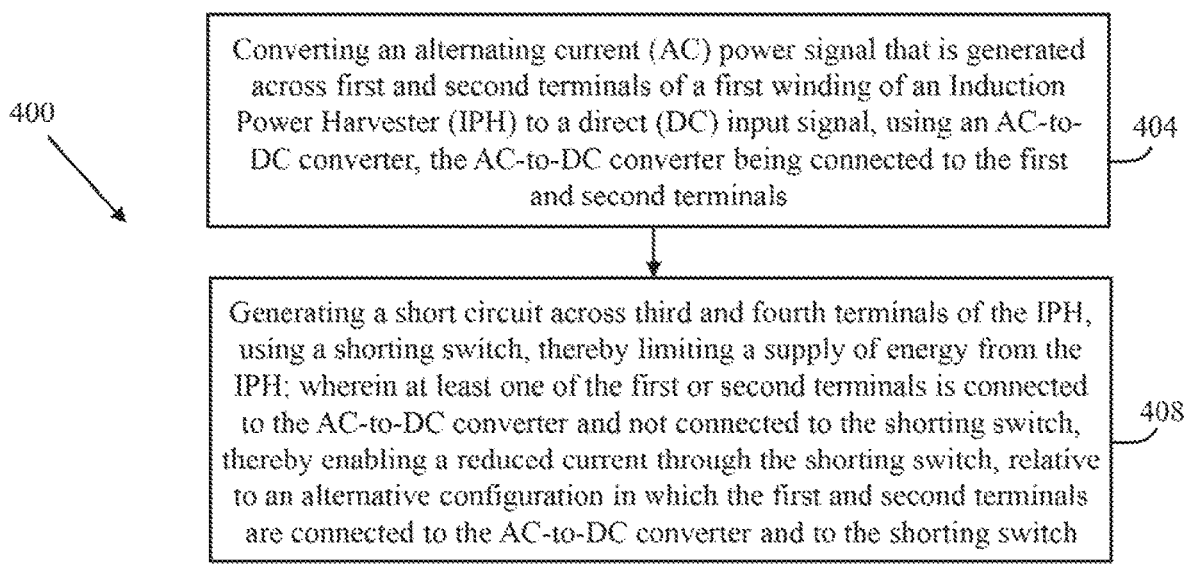
FIG. 4 is a flowchart illustrating an example of a method for limiting a supply of energy from an IPH, in accordance with the presently disclosed subject matter.
Figure 6:
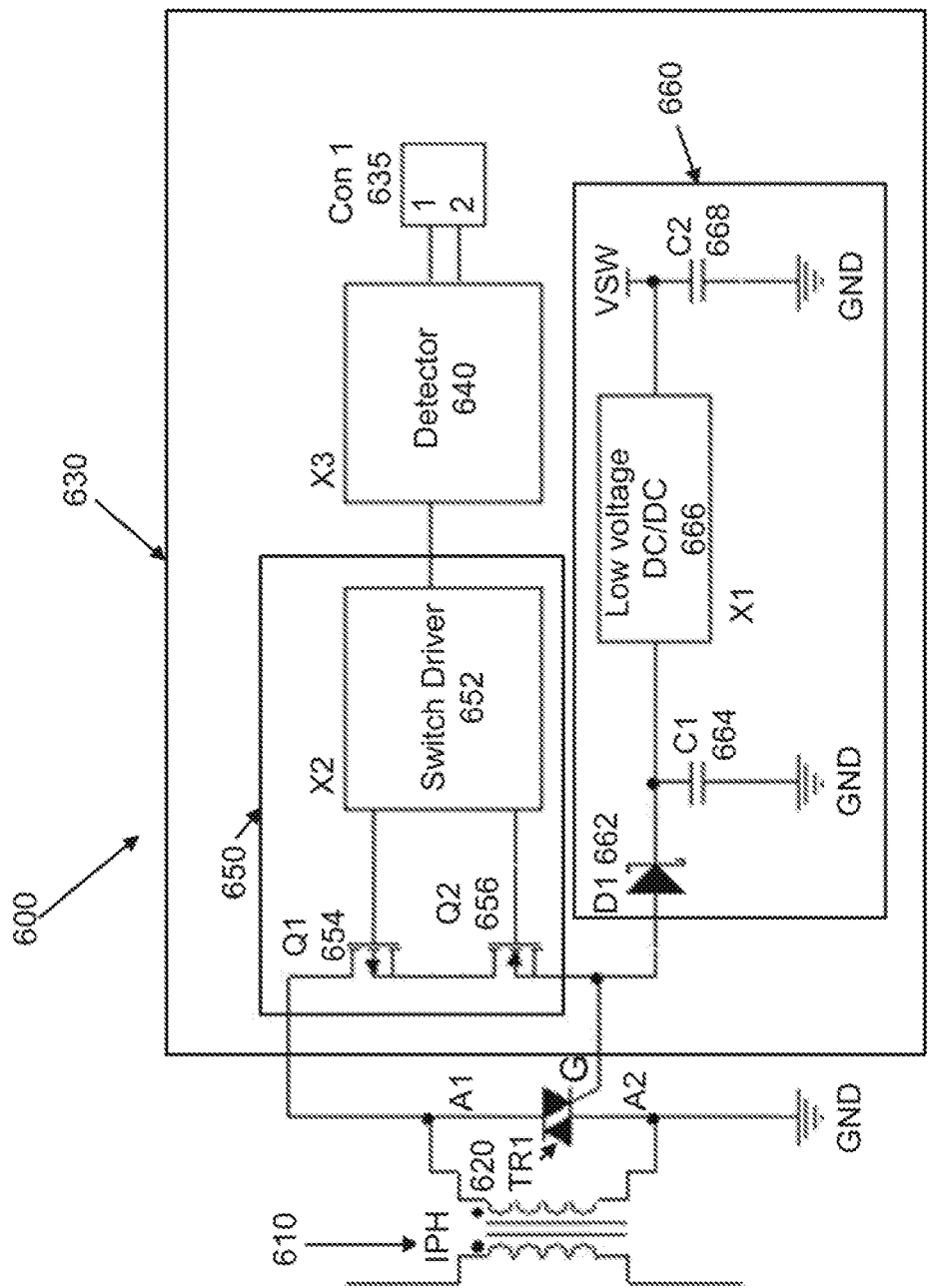
FIG. 6 is a block diagram schematically illustrating a second example of a system for physically installing an IPH on a live AC power line, in accordance with the presently disclosed subject matter.
Figure 7:
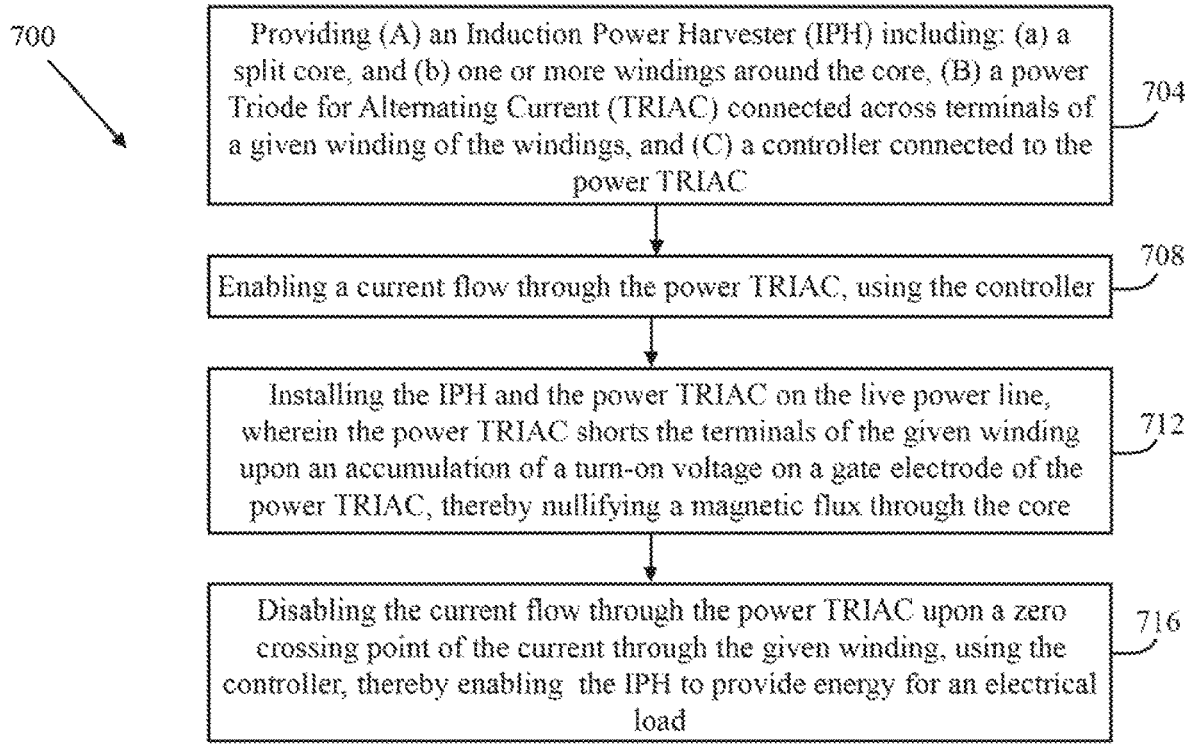
FIG. 7 is a flowchart illustrating an example of a method for physically installing an IPH on a live AC power line, in accordance with the presently disclosed subject matter.

In embodiments of the presently disclosed subject matter, fewer, more and/or different stages than those shown in FIGS. 2, 4 and 7 may be executed. In embodiments of the presently disclosed subject matter, one or more stages illustrated in FIGS. 2, 4 and 7 may be executed in a different order and/or one or more groups of stages may be executed simultaneously. FIGS. 1, 3, 5 and 6 illustrate general schematics of the system architecture in accordance with embodiments of the presently disclosed subject matter. Each module in FIGS. 1, 3, 5 and 6 can be made up of any combination of software, hardware and/or firmware that performs the functions as defined and explained herein. The modules in FIGS. 1, 3, 5 and 6 may be centralized in one location or dispersed over more than one location. In other embodiments of the presently disclosed subject matter, the system may comprise fewer, more, and/or different modules than those shown in FIGS. 1, 3, 5 and 6.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram that schematically illustrates an example of an inductive power harvesting system 100 for increasing a power draw from an Induction Power Harvester (IPH) 110, in accordance with the presently disclosed subject matter.

In accordance with the presently disclosed subject matter, inductive power harvesting system 100 can be configured to include the IPH 110, an extraction circuit 120, an electrical load 140, and, optionally, an energy storage bank 130, e.g. a battery or a storage capacitor. The electrical load 140 can be configured to include one or more devices.

IPH 110 can be configured to include: (a) a split magnetic core with a toroidal (i.e., ring or donut) shape (not shown); and (b) one or more windings (i.e., coils) wound around the core (not shown). IPH 110 can be mounted on a live AC power line (e.g., an underground Medium Voltage (MV) distribution line or an overhead high voltage transmission line) (not shown) to harvest power from the AC power line. By optimizing a selection of material(s) and a geometry for the core of IPH 110 and a number of windings wound around the core, an AC power signal of several watts can be supplied by the IPH 110. The core of IPH 110 can be manufactured from a high permeability ferromagnetic material, such as iron, steel, nickel, ferrite, or a combination thereof. Additionally, properties of IPH 110 can be selected to achieve a predefined impedance for IPH 110 in order for IPH 110 to efficiently provide energy for an electrical load 140, as detailed further herein.

IPH 110 can be configured to operate as follows. When IPH 110 is mounted on the AC power line, a magnetic field surrounding the AC power line threads the windings wound around the core of the IPH 110. This generates an alternating (AC) power signal 142 across first and second terminals of a charging winding of the windings for providing energy for the electrical load 140.

Extraction circuit 120 can be configured to include an AC-to-DC converter 145. AC-to-DC converter 145 can be configured to convert the AC power signal 142 to a direct (DC) input signal 152. AC-to-DC converter 145 can be configured to include a rectifier BR1 147, such as a full diode bridge rectifier (shown in FIG. 1), a voltage doubler, etc. Rectifier BR1 147 can be connected to the first and second terminals of the charging winding, and configured to convert AC power signal 142 to a DC signal. AC-to-DC converter 145 can also be further configured to include a smoothing capacitor C1 150 that smooths an output of rectifier BR1 147 to output DC input signal 152.

Extraction circuit 120 can be configured to include switching regulator 160. Switching regulator 160 can be configured to convert regulator input signal 157, which is substantially identical to DC input signal 152, to storage signal 165.

Energy storage bank 130 can be configured to store energy for powering electrical load 140 in accordance with storage signal 165. Additionally, or alternatively, electrical load 140 can be powered directly in accordance with storage signal 165.

Returning to extraction circuit 120, extraction circuit 120 can be configured to include a voltage divider 170. Voltage divider 170 can be connected between an output of switching regulator 160 and ground. Voltage divider 170 can be configured to include a first resistance R1 172 between the output of switching regulator 160 and feedback node FB 176 feeding the switching regulator 160, and a second resistance R2 174 between FB 176 and ground. FB 176 is external to switching regulator 160, which is designed to maintain a known voltage, e.g. 1V, at FB 176.

In some cases, voltage divider 170 can be configured as a fixed voltage divider 170, i.e. R1 172 and R2 174 are fixed. Alternatively, in some cases, voltage divider 170 can be configured as an adjustable voltage divider 170, i.e. a ratio of R1 172 to R2 174 is adjustable. In some cases, adjustable voltage divider 170 can be configured as a potentiometer. Alternatively, in some cases, adjustable voltage divider 170 can be configured to include at least one voltage-controlled resistor for adjusting at least one of R1 172 or R2 174.

It is an object of the present disclosure to increase a power draw from IPH 110. A first step for increasing the power draw from IPH 110 is to match away a reactive part of an inductive component L of a complex impedance Z of the IPH 110, as is commonly done, for example, in RFID tag power circuits. IPH 110 can be modeled as a Thevenin equivalent circuit, having a source voltage V and a complex source impedance Z having a magnitude |Z|. Most commonly, complex source impedance Z consists of an inductive component L in series with a resistive component $R_L$, the resistive component $R_L$ representing ohmic and magnetic losses in: (a) the windings wound around a core of IPH 110 and (b) the core of IPH 110. The power dissipated in an electrical load 140 having a conductance Y is as follows:

$$P = \frac{V^2 Y}{Y^2 |Z|^2 + 2YReZ + 1} \quad \text{(Equation 1)}$$

By calculating the derivative with respect to conductance Y of the electrical load 140, it can be shown that the electrical load 140 draws a maximum power from IPH 110 ($P_{max}$) in accordance with Equations 2 and 3 below:

$$P_{max} = \frac{V^2}{2(|Z| + ReZ)}, \quad R = |Z| \quad \text{(Equation 2, Equation 3)}$$

It follows from Equation 2 that in order for electrical load 140 to draw a maximum power from IPH 110, a reactive part of an inductive component L of a complex impedance Z of the IPH 110 must be matched away. This can be achieved by adding at least one capacitor C (not shown) to IPH 110. In some cases, the capacitor C can be added in series with IPH 110. At the matching frequency, $f = 1/2\pi\sqrt{L \cdot C}$, the source inductance of inductive component L is canceled out by the capacitance of capacitor C, thereby resulting in a complex source impedance Z having only the irreducible loss term $R_L$. Alternatively, in some cases, the capacitor C can be added in parallel with IPH 110. Unlike the case in which the capacitor C is connected in series with IPH 110, a magnitude of complex source impedance |Z| is increased in the case that the capacitor C is connected in parallel with IPH 110. Nevertheless, in this case, the electrical load 140 efficiently draws power from IPH 110, since the Thevenin voltage V increases to compensate for the increase in |Z|.

A second step for increasing the power draw from IPH 110 is to match an impedance of the electrical load 140 to a magnitude of the IPH impedance |Z|, in accordance with Equation 3. This is problematic because power supply circuits that supply power to electrical loads are designed to regulate their output voltage or their output current, such that their input impedance (i.e., the impedance that they present to power source circuits, such as IPH 110) varies, e.g. in accordance with their current draw (i.e., input current) or input voltage.

To solve this problem, extraction circuit 120 can be configured to include an impedance controller 185. Impedance controller 185 can be configured to obtain: (a) a measured voltage value 182 that is indicative of an electric current of regulator input signal 157, i.e. an input current of switching regulator 160, and (b) a voltage of regulator input signal 157, i.e. an input voltage of switching regulator 160. An actual input impedance of switching regulator 160 is defined by a ratio of the input voltage of switching regulator 160 to the input current of switching regulator 160.

In some cases, as shown in FIG. 1, extraction circuit 120 can be configured to generate measured voltage value 182 using an operational amplifier 180. Specifically, extraction circuit 120 can be configured to include a sense resistor 155 between an output of AC-to-DC converter 145 and an input of switching regulator 160, across which a differential voltage is generated. Operational amplifier 180 can be configured to amplify this differential voltage to generate the measured voltage value 182.

Impedance controller 185 can be configured to generate an impedance control signal 187, in accordance with a difference between an actual input impedance of switching regulator 160 and a desired input impedance of switching regulator 160. The desired input impedance is a predefined impedance that is substantially identical to a magnitude of an impedance (i.e., resistance) of IPH 110 and to a resistance of electrical load 140, such that maximum power can be drawn by electrical load 140 from IPH 110.

Impedance controller 185 can be configured to increase impedance control signal 187 in response to an increase in current drawn by switching regulator 160. This results in a reduced voltage level of storage signal 165, for reasons detailed further herein, and a consequent reduction in the current drawn by switching regulator 160. Conversely, impedance controller 185 can be configured to decrease impedance control signal 187 in response to an increase in the input voltage of the switching regulator 160. This results in an increased voltage level of storage signal 165, for reasons detailed further herein, and a consequent increase in the current drawn by switching regulator 160. At a stable point, the impedance control signal 187 is constant, thereby enforcing an actual input impedance of switching regulator 160 that is substantially identical to a desired input impedance of switching regulator 160.

In some cases, impedance controller 185 can be configured as an analog impedance controller 185, such as an analog integrating feedback circuit, a PID controller, fuzzy logic methods, or the like.

Alternatively, in some cases, impedance controller 185 can be configured as a digital impedance controller 185, such as a microprocessor or the like. Digital impedance controller 185 can be configured to sample the measured voltage value 182 and the voltage of regulator input signal 157, and to generate impedance control signal 187 in accordance with a control algorithm.

In some cases, digital impedance controller 185 can be configured to dynamically adjust the desired input impedance of switching regulator 160 programmatically to adapt the desired input impedance to changing circumstances (e.g., installation of a new IPH 110, changes in properties (e.g., heating, ageing) of an existing IPH 110, installation of the IPH 110 on a new AC power line having a different line frequency, change in a line frequency of an AC power line on which the IPH 110 is installed, etc), to maximize the power draw from IPH 110. For example, digital impedance controller 185 can be configured to algorithmically set the desired input impedance in accordance with a control algorithm. Digital impedance controller 185 can then be configured to measure incoming power at switching regulator 160. Following this step, digital impedance controller 185 can be configured to vary the desired input impedance up and down while observing a direction of variation in the incoming power at switching regulator 160. Digital impedance controller 185 can then use an optimization algorithm, such as Newton-Raphson or gradient descent, to select an optimal desired input impedance of the switching regulator 160 for maximizing the power draw from IPH 110, thus adapting the desired input impedance to changing circumstances.

Feedback node controller 190 can be configured to control feedback node FB 176, in accordance with voltage control signal 187, to realize a voltage level of storage signal 165. i.e. an output voltage of switching regulator 160, for achieving the desired input impedance.

In some cases, feedback node controller 190 can be configured to control FB 176 by routing an additional current 192 into FB 176, in accordance with voltage control signal 187. When an actual input impedance of switching regulator 160 is substantially identical to a desired input impedance thereof, impedance controller 185 can be configured to generate the impedance control signal 187 that maintains the actual input impedance. Feedback node controller 190 can be configured to route an additional current 192 into FB 176 in accordance with the impedance control signal 187.

When the actual input impedance of switching regulator 160 is greater than the desired input impedance thereof due to an increase in an input voltage of switching regulator 160, impedance controller 185 can be configured to decrease impedance control signal 187. Feedback node controller 190 can be configured to decrease the additional current 192 fed into FB 176 in accordance with the decreased impedance control signal 187. As a result, a current flowing through first resistive element R1 172 increases, a voltage level of storage signal 165 increases, and more current is drawn by switching regulator 160, thereby regulating input impedance of the switching regulator 160 to achieve the desired input impedance thereof.

Conversely, when the actual input impedance of switching regulator 160 is less than the desired input impedance thereof due to an increased current draw by switching regulator 160, impedance controller 185 can be configured to increase impedance control signal 187. Feedback node controller 190 can be configured to increase the additional current 192 fed into FB 176 in accordance with the increased impedance control signal 187. As a result, a current flowing through first resistive element R1 172 decreases, a voltage level of storage signal 165 decreases, and less current is drawn by switching regulator 160, thereby regulating input impedance of the switching regulator 160 to achieve the desired input impedance thereof. In one example, feedback node controller 190 can be configured to include a third resistive element and a diode (not shown), and to generate the additional current 192 by passing impedance control signal 187 through the third resistive element and the diode.

In some cases, feedback node controller 190 can be configured to control feedback node FB 176 by generating a voltage divider control signal 194 for adjusting at least one of first resistance R1 172 or second resistance R2 174 of an adjustable voltage divider 170. In some cases, adjustable voltage divider 170 can be configured as a potentiometer. In some cases, adjustable voltage divider 170 can be configured to include at least one voltage-controlled resistor.

When an actual input impedance of switching regulator 160 is greater than the desired input impedance thereof due to an increase in an input voltage of switching regulator 160, impedance controller 185 can be configured to decrease impedance control signal 187. In addition, feedback node controller 190 can be configured to generate voltage divider control signal 194 for adjusting at least one of first resistance R1 172 or second resistance R2 174 to achieve an increase in a voltage level of storage signal 165, in accordance with the decreased impedance control signal 187. This results in an increased current draw by switching regulator 160, thereby regulating input impedance of the switching regulator 160 to achieve the desired input impedance thereof.

Conversely, when the actual input impedance of switching regulator 160 is less than the desired input impedance thereof due to an increased current draw by switching regulator 160, impedance controller 185 can be configured to increase impedance control signal 187. In addition, feedback node controller 19) can be configured to generate voltage divider control signal 194 for adjusting at least one of first resistance R1 172 or second resistance R2 174 to achieve a decrease in a voltage level of storage signal 165, in accordance with the increased voltage control signal 187. This results in a decreased current draw by switching regulator 160, thereby regulating input impedance of the switching regulator 160 to achieve the desired input impedance thereof.

Attention is now drawn to FIG. 2, a flowchart illustrating an example of a method for increasing a power draw from IPH 110 (200), in accordance with the presently disclosed subject matter.

In the illustrated example, an AC-to-DC converter 145 can be configured to convert an alternating (AC) power signal 142 that is generated across first and second terminals of a winding of IPH 110 to a direct (DC) input signal 152, as detailed earlier herein, inter alia with reference to FIG. 1, the AC-to-DC converter 145 being connected to the first and second terminals (block 204).

A switching regulator 160 can be configured to obtain a regulator input signal 157, in accordance with the DC input signal 152, as detailed earlier herein, inter alia with reference to FIG. 1, wherein a ratio of a voltage level of regulator input signal 157 to a current of the regulator input signal 157 defines an actual input impedance of switching regulator 160 (block 208).

Impedance controller 185 can be configured to obtain: (a) a measured voltage value 182 that is indicative of the current of the regulator input signal 157, as detailed earlier herein, inter alia with reference to FIG. 1, and (b) the voltage level of regulator input signal 157 (block 212).

Impedance controller 185 can also be configured to generate an impedance control signal 187, as detailed earlier herein, inter alia with reference to FIG. 1, in accordance with a difference between the actual input impedance of switching regulator 160 and a desired input impedance of switching regulator 160, wherein the desired input impedance is a predefined impedance (block 216).

Feedback node controller 190 can be configured to control feedback node FB 176 feeding switching regulator 160, in accordance with impedance control signal 187, to realize a voltage level of storage signal 165, i.e. an output voltage of switching regulator 160, for achieving the desired input impedance, as detailed earlier herein, inter alia with reference to FIG. 1, wherein FB node 176 is external to switching regulator 160, thereby regulating the input impedance of switching regulator 160 externally to the switching regulator 160 (block 220).

It is to be noted that, with reference to FIG. 2, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Attention is now drawn to FIG. 3, a block diagram schematically illustrating an example of an inductive power harvesting system 300 for limiting a supply of energy from an Induction Power Harvester (IPH) 310, in accordance with the presently disclosed subject matter.

In accordance with the presently disclosed subject matter, inductive power harvesting system 300 can be configured to include IPH 310. IPH 310 can be configured to include: (a) a split magnetic core with a toroidal (i.e., ring or donut) shape (not shown); and (b) one or more windings (i.e., coils) wound around the core (not shown). IPH 310 can be mounted on a live AC power line (e.g., an underground Medium Voltage (MV) distribution line or an overhead high voltage transmission line) (not shown) to harvest power from the AC power line.

IPH 310 can be configured to operate as follows. When IPH 310 is mounted on the AC power line, a magnetic field surrounding the AC power line threads the windings wound around the core of the IPH 310. This generates an alternating (AC) power signal 312 across first and second terminals of a charging winding of the windings to provide energy for an electrical load 380. Electrical load 380 can be configured to include one or more devices.

Inductive power harvesting system 300 can be configured to include an AC-to-DC converter 315 for converting AC power signal 312 to a direct (DC) input signal 322. AC-to-DC converter 315 can be configured to include a rectifier BR3 317, such as a full diode bridge rectifier (shown in FIG. 3), a voltage doubler, etc. Rectifier BR3 317 is connected to the first and second terminals of the charging winding, and is configured to convert AC power signal 312 to a DC signal. AC-to-DC converter 315 can also be configured to include a smoothing capacitor C4 320 that smooths an output of rectifier BR3 317 to output DC input signal 322.

Inductive power harvesting system 300 can be configured to include a DC-to-DC converter 360 for converting the DC input signal 322 to a storage signal 365. Inductive power harvesting system 300 can also be configured to include, optionally, an energy storage bank 370, e.g., a battery or a storage capacitor. Energy storage bank 370 can be configured to store energy for powering electrical load 380 in accordance with storage signal 365. Additionally, or alternatively, electrical load 380 can be powered directly in accordance with storage signal 365.

Inductive power harvesting system 300 can also be configured to include a shorting switch TR3 355. In some cases, as illustrated in FIG. 3, shorting switch TR3 355 can be a power Triode for Alternating Current (TRIAC). When current flows through shorting switch TR3 355, a short circuit is generated across third and fourth terminals of IPH 310 (i.e., the IPH 310 is shorted), and no current flows through rectifier BR3 317 (i.e., no energy is supplied from IPH 310 to rectifier BR3 317). This limits the supply of energy from IPH 310. Indeed, by shorting IPH 310 using a shorting switch TR3 355, power dissipation during the shorting of the IPH 310 is limited to ohmic losses in wires of the IPH 310 and the shorting switch TR3 355. There are no magnetic losses in a core of IPH 310 when IPH 310 is shorted, since there is no net magnetic flux in the core when IPH 310 is shorted (the magnetic flux induced by the current in the AC power line is exactly offset by magnetic flux induced by the current flowing in the windings of IPH 310).

At least one of the first or second terminals is connected to AC-to-DC converter 315 and not connected to the shorting switch TR3 355, thereby enabling a reduced current through IPH 310 and shorting switch TR3 355 when the IPH 310 is shorted, relative to an alternative configuration in which the first and second terminals are connected to the AC-to-DC converter 315 and to the shorting switch TR3 355. In some cases, as shown in FIG. 3, the charging winding of IPH 310 can be configured to include multiple taps. Inductive power harvesting system 300 can be configured to connect shorting switch TR3 355 to a first tap of the multiple taps on the charging winding, such that the short circuit is generated across third and fourth terminals of the first winding. Moreover, inductive power harvesting system 300 can be configured to connect AC-to-DC converter 315 to a second tap of the multiple taps on the charging winding, the first tap including a larger number of turns of the charging winding than the second tap. In this manner, the current through IPH 310 and shorting switch 355 when a short circuit is generated is reduced relative to the alternative configuration in which the first and second terminals are connected to the AC-to-DC converter 315 and to the shorting switch TR3 355 by a factor of the ratio of the turns on the first tap to the turns on the second tap. This enables the use of thinner wiring and smaller connectors.

Alternatively, in some cases (not shown in FIG. 3), inductive power harvesting system 300 can be configured to connect shorting switch TR3 355 across third and fourth terminals of a shorting winding of IPH 310, different than the charging winding. The shorting winding can be configured to conduct less current than the charging winding, thereby enabling a reduced current through IPH 310 and shorting switch TR3 355 when a short circuit is generated relative to an alternative configuration in which the first and second terminals are connected to the AC-to-DC converter 315 and to the shorting switch TR3 355.

In some cases, shorting switch TR3 355 can be completely embedded within a mechanical structure of IPH 310, in which case there are no high current lines coming out of the mechanical structure of IPH 310.

In some cases, inductive power harvesting system 300 can be configured to allow current to flow through shorting switch TR3 355, thereby generating a short circuit across third and fourth terminals of IPH 310, in response to DC input signal 322 being greater than or equal to a first threshold. In some cases, DC input signal 322 can be a DC input voltage signal 322, and inductive power harvesting system 300 can be configured to allow current to flow through shorting switch TR3 355 in response to the DC input voltage signal 322 being greater than or equal to a first threshold voltage. Additionally. or alternatively, in some cases. DC input signal 322 can be a DC electrical current input signal 322, and inductive power harvesting system 300 can be configured to allow current to flow through shorting switch TR3 355 in response to the DC electrical current input signal 322 being greater than or equal to a first threshold electrical current. By enabling the generation of a short circuit across third and fourth terminals of IPH 310 when DC input signal 322 is greater than or equal to a first threshold, inductive power harvesting system 300 can be configured to reduce the complexity and cost of manufacturing induction power harvesting system 300. To explain, DC input signal 322 will be greater than or equal to a first threshold when there are very large line currents (e.g., hundreds of amperes) on an AC power line on which IPH 310 is mounted. As the line currents on an AC power line increase, the current drawn by AC-to-DC converter 315 increases (i.e., AC power signal 312 includes a large current), resulting in an increased DC electrical current input signal 322 at the output of AC-to-DC converter 315. However, the electrical current drawn by AC-to-DC converter 315 will increase only to a level of electrical current that is required by AC-to-DC converter 315. Once the electrical current in AC power signal 312 increases to a maximum level that is required by AC-to-DC converter 315, AC-to-DC converter 315 will stop drawing additional current, thus presenting a high impedance to IPH 310. This can cause the voltage level of AC power signal 312 to increase up to the open circuit EMF, which can be very high for large line currents. This requires the entire power path for energy extraction from IPH 310, including the wiring, connectors, and AC-to-DC converter 315 to be designed to withstand the high voltage level of AC power signal 312, thus greatly increasing the complexity and cost of manufacturing the induction power harvesting system 300. In order to avoid a high voltage level for AC power signal 312, induction power harvesting circuit 300 can be configured to short IPH 310 in response to DC input signal 312 being greater than or equal to a first threshold. An additional advantage of shorting IPH 310 during high current operation of the AC power line on which IPH 310 is mounted is the absence of fluctuating magnetic forces operating on a shorted IPH 310, which may greatly simplify the mechanical design of IPH 310. In response to the DC input signal dropping below a second threshold, the second threshold being less than or equal to the first threshold, induction power harvesting circuit 300 can be configured to remove the short circuit across the third and fourth terminals, enabling current to flow through AC-to-DC converter 315, and thereby enabling the supply of energy from the IPH to be resumed.

An example of an inductive power harvesting system 300 for generating a short circuit across third and fourth terminals of IPH 310 in response to a DC voltage signal 322 being greater than or equal to a first threshold voltage is shown in FIG. 3. As shown in FIG. 3, inductive power harvesting system 300 can be configured to include a voltage divider comprising resistances R10 325 and R11 330. Inductive power harvesting system 300 can also be configured to include a comparator 340. Voltage divider can be configured to output a comparator input voltage signal 332 to a positive terminal of comparator 340, the comparator input voltage signal 332 having a voltage level that is a fraction of a voltage level $V_{C3}$ on capacitor C3 320 (i.e., a voltage level of DC voltage signal 322). The negative terminal of comparator 340 can be configured to obtain a predefined voltage level 334. In some cases, comparator 340 can be configured to generate the predefined voltage level 334, as shown in FIG. 3. Alternatively, in some cases, comparator 340 can be configured to obtain the predefined voltage level 334 from an external source.

When a voltage level of comparator input voltage signal 332 increases above the predefined voltage level 334, the predefined voltage level 334 being a first predefined voltage level, comparator 340 can be configured to generate a comparator output signal 342 having a first voltage value for enabling a flow of current through shorting switch 355 and the consequent generation of a short circuit across third and fourth terminals of IPH 310. As such, the short circuit across the third and fourth terminals of IPH 310 is generated in response to DC voltage signal 322 being greater than or equal to a first threshold voltage.

In some cases, as shown in FIG. 3, an OPTO-TRIAC TR4 350 can be configured to obtain the comparator output signal 342 (via resistance R13 345), the OPTO-TRIAC TR4 350 being energized when the comparator output signal 342 has the first voltage value. OPTO-TRIAC TR4 350, when energized, can be configured to allow current to flow through shorting switch 355 (e.g., via resistance R12 352), thereby shorting IPH 310. Although FIG. 3 illustrates enabling a flow of current through shorting switch 355 using OPTO-TRIAC TR4 350, a variety of devices can be configured to enable a flow of current through shorting switch 355 upon obtaining comparator output signal 342 having the first voltage value, such devices including an electromagnetic relay, a solid state relay, a power MOSFET switch, an IGBT, etc.

When IPH 310 is shorted, no current flows into AC-to-DC converter 315. Voltage $V_{C3}$ of smoothing capacitor 320 (i.e., a voltage level of DC input signal 322) begins to decay in accordance with power drawn by a downstream electrical load 380, resulting in a corresponding decay in a voltage level of comparator input voltage signal 332. When comparator input voltage signal 332 drops below a predefined voltage level 334, the predefined voltage level 334 being a second predefined voltage level being less than or equal to the first predefined voltage level, comparator 340 can be configured to generate comparator output signal 342 having a second voltage value for disabling a flow of current through shorting switch 355, thereby removing the short circuit across the third and fourth terminals of IPH 310. As such, the short circuit across the third and fourth terminals of IPH 310 is removed in response to a DC voltage signal 322 dropping below a second threshold voltage. When the short circuit across the third and fourth terminals of IPH 310 is removed, current can flow through AC-to-DC converter 315, thereby enabling the supply of energy from IPH 310 to resume. Voltage $V_{C3}$ of capacitor C4 320 begins to rise until it again reaches a first threshold voltage, upon which the short circuit across the third and fourth terminals of IPH 310 is reapplied.

In some cases, the first predefined voltage level of reference voltage signal 334 and the second predefined voltage level of reference voltage signal 334 can be fixed. As such, induction power harvesting system 300 can be configured to generate a short circuit across third and fourth terminals of IPH 310 when DC input signal 322 is greater than or equal to a fixed first threshold, and to remove the short circuit across third and fourth terminals of IPH 310 when DC input signal 322 is less than a fixed second threshold. Alternatively, in some cases, at least one of the first predefined voltage level of reference voltage signal 334 or the second voltage level of reference voltage signal 334 can be variable. As such, induction power harvesting system 300 can be configured to generate a short circuit across third and fourth terminals of IPH 310 when DC input signal 322 is greater than or equal to a variable first threshold and/or remove the short circuit across third and fourth terminals of IPH 310 when DC input signal 322 is less than a variable second threshold.

In some cases, the at least one of the variable first threshold or the variable second threshold can be varied in accordance with one or more of: a voltage level of storage signal 365, a charge level of energy storage bank 370, or power requirements of electrical load 380. When energy storage bank 370 is a storage capacitor, the charge level of energy storage bank 370 can be determined in accordance with the voltage level of storage signal 365. When energy storage bank 370 is a battery, the charge level of energy storage bank 370 can be determined in accordance with one of several methods, depending on the circumstances. As a first non-limiting example, the charge level of the battery can be determined in accordance with the voltage level of storage signal 365. As a second non-limiting example, the charge level of the battery can be determined in accordance with the voltage level of storage signal 365 and the temperature of the battery. As a third non-limiting example, the charge level of the battery can be determined in accordance with a battery fuel gauge.

In some cases, in addition to or as an alternative to generating a short circuit across the third and fourth terminals of IPH 310 in response to DC input signal 322 being greater than or equal to a first threshold, inductive power harvesting system 300 can be configured to generate a short circuit across the third and fourth terminals of IPH 310 in response to a voltage level of storage signal 365 being greater than or equal to a third threshold or a charge level of energy storage bank 370 being greater than or equal to a first charge level. In some cases in which the short circuit across the third and fourth terminals of IPH 310 is generated in response to a voltage level of storage signal 365 being greater than or equal to a third threshold, inductive power harvesting system 300 can be configured to remove the short circuit in response to the voltage level of storage signal 365 dropping below a fourth threshold, the fourth threshold being less than or equal to the third threshold, thereby enabling the supply of energy from IPH 310 to be resumed. In some cases in which the short circuit across the third and fourth terminals of IPH 310 is generated in response to a charge level of energy storage bank 370 being greater than or equal to a first charge level, inductive power harvesting system 300 can be configured to remove the short circuit in response to the charge level of energy storage bank 370 dropping below a second charge level, the second charge level being less than or equal to the first charge level, thereby enabling the supply of energy from IPH 310 to be resumed.

Attention is now drawn to FIG. 4, a flowchart illustrating an example of a method for limiting a supply of energy from an IPH 310 (400), in accordance with the presently disclosed subject matter. The IPH 310 can be configured to provide energy for an electrical load 380. The electrical load 380 can be configured to include one or more devices.

In the illustrated example, an AC-to-DC converter 315 can be configured to convert an alternating current (AC) power signal 312 that is generated across first and second terminals of a first winding of IPH 310 to a direct (DC) input signal 322, as detailed earlier herein, inter alia with reference to FIG. 3, the AC-to-DC converter 315 being connected to the first and second terminals (block 404).

Inductive power harvesting system 300 can be configured to generate a short circuit across third and fourth terminals of IPH 310, using shorting switch 355, as detailed earlier herein, inter alia with reference to FIG. 3, thereby limiting a supply of energy from the IPH 310. At least one of the first or second terminals is connected to AC-to-DC converter 315 and not connected to shorting switch 355, thereby enabling a reduced current through shorting switch 355, relative to an alternative configuration in which the first and second terminals are connected to AC-to-DC converter 315 and to shorting switch 355 (block 408).

It is to be noted that, with reference to FIG. 4, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Figure 5:
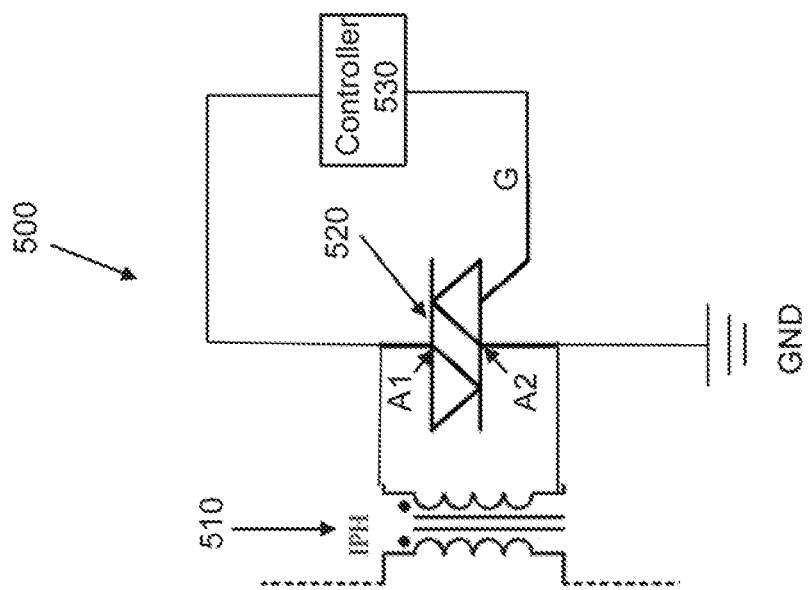
FIG. 5 is a block diagram schematically illustrating a first example of a system for physically installing an IPH on a live alternating current (AC) power line, in accordance with the presently disclosed subject matter.

Attention is now drawn to FIG. 5, a block diagram schematically illustrating a first example of a system 500 for physically installing an Induction Power Harvester (IPH) 510 on a live AC power line, in accordance with the presently disclosed subject matter.

In accordance with the presently disclosed subject matter, system 500 can include IPH 510. IPH 510 can be configured to include: (a) a split magnetic core with a toroidal (i.e., ring or donut) shape (not shown); and (b) one or more windings (i.e., coils) wound around the core (not shown). IPH 510 can be mounted on the live AC power line (e.g., an underground Medium Voltage (MV) distribution line or an overhead high voltage transmission line) (not shown) to harvest power from the AC power line.

System 500 can also be configured to include a power TRIAC 520. The power TRIAC 520 can be connected across terminals of a given winding of the windings wound around the core of IPH 510, and physically installed on the AC power line together with IPH 510.

System 500 can be further configured to include a controller 530. Controller 530 can be connected between a first anode electrode A1 and a gate electrode G of power TRIAC 520. Controller 530 can be configured to enable current flow through power TRIAC 520, prior to installing the IPH 510 and the power TRIAC 520 on the live AC power line. A second anode electrode A2 of power TRIAC 520 can be connected to ground.

Upon installation of the IPH 510 and the power TRIAC 520 on the live AC power line, voltage begins to accumulate on the gate electrode G of power TRIAC 520. Upon an accumulation of a small turn-on voltage (on the order of approximately 0.7V to 1.4V) on the gate electrode G of power TRIAC 520, current begins to flow through power TRIAC 520, thereby shorting the terminals of the given winding of IPH 510 across which the power TRIAC 520 is connected and nullifying a magnetic flux through the core of IPH 510 (the magnetic flux induced by the current in the live AC power line is exactly offset by magnetic flux induced by the current flowing in the windings of IPH 510).

In this manner, the installation of IPH 510 on a live AC power line can be performed by the installer in a safe manner, since the two halves of the split core are not drawn together at a high attractive force during the installation of IPH 510, and since there is no voltage spike at the terminals of the given winding of IPH 510 during the installation.

System 500 can be configured to disable the current flow through power TRIAC 520 upon a zero crossing point of the current through the given winding of IPH 510, using the controller 530, thereby enabling IPH 510 to provide energy for an electrical load (not shown), which can include one or more devices.

In some cases, once IPH 510 has been installed on the live power line, controller 530 can be configured to disable the current flow through power TRIAC 520.

In some cases, controller 530 can be configured as a manual switch. The manual switch can be connected between the anode electrode A1 and the gate electrode G of the power TRIAC 520. The manual switch can be closed prior to installing the IPH 510 and the power TRIAC 520 on the live power line to enable current flow through power TRIAC 520. The manual switch can be opened to disable the current flow through the power TRIAC 520 after the IPH 510 and the power TRIAC 520 are installed on the live power line.

In some cases, controller 530 can be configured as a reed switch. The reed switch can be placed inside a protection circuit enclosure (e.g., a narrow glass tube). The reed switch can be connected between the first anode electrode A1 and the gate electrode G of the power TRIAC 520.

The reed switch can be closed by applying an external magnetic field to the reed switch. The external magnetic field can be applied to the reed switch by a magnet (e.g., a permanent magnet) that is brought near the reed switch (e.g., by affixing the magnet to the outside of the protection circuit enclosure). The reed switch can be closed prior to installing the IPH 510 and the power TRIAC 520 on the live power line to enable current flow through power TRIAC 520.

The reed switch can be opened by stopping the application of the external magnetic field to the reed switch, e.g., by distancing the magnet from the reed switch. The reed switch can be opened to disable current flow through the power TRIAC after the IPH 510 and the power TRIAC 520 are installed on the live power line.

In some cases, controller 530 can be an electrical connector that includes a first pin electrically connected to the first anode electrode A1 of power TRIAC 520 and a second pin electrically connected to the gate electrode G of power TRIAC 520. The first and second pins can be shorted together external to the power TRIAC 520 to generate a short circuit between the first anode electrode A1 and the gate electrode G, thereby enabling current flow through power TRIAC 520 prior to installing the IPH 510 and the power TRIAC 520 on the live power line. The short between the first pin and the second pin can be removed, thereby removing the short circuit between the first anode electrode A1 and the gate electrode G, to disable current flow through the power TRIAC after the IPH 510 and the power TRIAC 520 are installed on the live power line.

Controller 530 can also be configured to enable current flow through the power TRIAC 520 prior to removing the IPH 510 and the power TRIAC 520 from the live power line, thereby shorting the terminals of the given winding of IPH 510 across which the power TRIAC 520 is connected and nullifying a magnetic flux through the core of IPH 510 prior to removing the IPH 510 from the live power line. By nullifying the magnetic flux through the core of IPH 510 prior to removing the IPH 510 from the live power line, it is ensured that the two halves of the core of IPH 510 are not held together with a substantial magnetic force during the removal, enabling safe and easy removal of the IPH 510 from the live power line.

Attention is now drawn to FIG. 6, a block diagram schematically illustrating a second example of a system 600 for physically installing an IPH 610 on a live AC power line, in accordance with the presently disclosed subject matter.

In accordance with the presently disclosed subject matter, system 600 can be configured to include IPH 610. IPH 610 can be configured to include: (a) a split magnetic core with a toroidal (i.e., ring or donut) shape (not shown); and (b) one or more windings (i.e., coils) wound around the core (not shown). IPH 610 can be mounted on the live AC power line (e.g., an underground Medium Voltage (MV) distribution line or an overhead high voltage transmission line) (not shown) to harvest power from the AC power line.

System 600 can also include power TRIAC 620. Power TRIAC 620 can be connected across terminals of a given winding of the windings wound around the core of IPH 610, and physically installed on the AC power line together with IPH 610.

System 600 can further include a controller 630. Controller 630 can be connected between a first anode electrode A1 and a gate electrode G of power TRIAC 620. A second anode electrode A2 of power TRIAC 620 can be connected to ground.

Controller 630 can be configured to automatically detect a presence or an absence of an electrical load (not shown) to be powered by energy extracted from IPH 610. The electrical load can be configured to include one or more devices.

When controller 630 detects an absence of the electrical load, controller 630 can be configured to enable current flow through power TRIAC 620, thereby shorting the terminals of the given winding of IPH 610 across which the power TRIAC 620 is connected. This results in a nullification of a magnetic flux through the core of IPH 610 (the magnetic flux induced by the current in the live AC power line is exactly offset by magnetic flux induced by the current flowing in the windings of IPH 610), thereby stopping or preventing a supply of energy from IPH 610 when the electrical load is not connected.

Alternatively, when controller 630 detects a presence of the electrical load, controller 630 can be configured to disable current flow through power TRIAC 620 upon a zero crossing point of the current through the given winding across which power TRIAC 620 is connected, thereby removing the short across the terminals of the given winding of IPH 610, and enabling the supply of energy from IPH 610 to begin or to resume.

Controller 630 can be configured to include an electrical connector Con1 635, a detector X3 640, a switching circuit 650, and a power supply circuit 660.

The electrical load to be powered by energy extracted from IPH 610 can be connected between first and second pins of electrical connector Con1 635.

Detector X3 640 can be connected to the first and second pins of electrical connector Con1 635. Detector X3 640 can be configured to detect a presence or an absence of the electrical load between the first and second pins of electrical connector Con1 635, as detailed further herein.

Detector X3 640 can also be configured to control switching circuit 650 to enable current flow through power TRIAC 620 in the absence of the electrical load, and to disable current flow through power TRIAC 620 in the presence of the electrical load. In some cases, switching circuit 650 can be configured to include switch driver X2 652 and an electrical switch comprising transistor Q1 654 and transistor Q2 656.

The operation of the controller 630 during the physical installation of the IPH 610 and the power TRIAC 620 on the live power line will now be described. Prior to the physical installation, controller 630 can be configured to enable current flow through power TRIAC 620. Upon installation of the IPH 610 and the power TRIAC 620 on the live power line, voltage begins to accumulate on the gate electrode G of power TRIAC 620. Upon an accumulation of a small turn-on voltage (on the order of approximately 0.7V to 1.4V) on the gate electrode G of power TRIAC 620, current begins to flow through power TRIAC 620, thereby shorting the terminals of the given winding of IPH 610 across which the power TRIAC 620 is connected and nullifying a magnetic flux through the core of IPH 610.

In some cases, the turn-on voltage that accumulates on the gate electrode G of power TRIAC 620 can also accumulate at an input of power supply circuit 660. Based on this turn-on voltage, power supply circuit 660 can be configured to boost the turn-on voltage to produce an output voltage VSW. Detector X3 640 can be configured, based on output voltage VSW, to apply a voltage across the first and second pins of connector Con1 635.

When an electrical load is connected between the first and second pins of connector Con1 635, a current begins to flow between the first and second pins. Detector X3 640 can be configured to detect this current flow, and, in accordance therewith, control switching circuit 640 to disable current flow through power TRIAC 620. Conversely, until an electrical load is connected between the first and second pins of connector Con1 635, no current flows between the first and second pins. Detector X3 640 can be configured to detect the absence of a current flow between the first and second pins, and, in accordance therewith, control switching circuit 640 to enable current flow through power TRIAC 620.

In some cases, power supply circuit 660 can be configured to include diode Dl 662, a first storage capacitor C1 664, low voltage DC-to-DC boost circuit 666, and second storage capacitor C2 668. As the turn-on voltage accumulates at the input of the power supply circuit 660, a voltage accumulates across first storage capacitor C1 664. In some cases, the voltage that accumulates across first storage capacitor C1 664 can be at least 500 mV. Low voltage DC-to-DC boost circuit 666 can be configured to boost the voltage that accumulates across first storage capacitor C1 664 to voltage VSW, and to apply the voltage VSW to the second storage capacitor C2 668. The low voltage DC-to-DC boost circuit 676 can be, for example, the LTC3108-1 manufactured by Linear Technology Corporation. As noted earlier herein, detector X3 640 can be configured, based on output voltage VSW, to apply a voltage across the first and second pins of connector Con1 635 to detect the presence or absence of an electrical load.

Controller 630 can also enable current flow through the power TRIAC 520 prior to removing the IPH 610 and the power TRIAC 620 from the live power line, thereby shorting the terminals of the given winding of IPH 610 across which power TRIAC 620 is connected and nullifying a magnetic flux through the core of IPH 610 prior to removing the IPH 610 from the live power line.

Attention is now drawn to FIG. 7, a flowchart illustrating an example of a method for physically installing IPH 510 or 610 on a live AC power line (700), in accordance with the presently disclosed subject matter.

In the illustrated example, system 500 or 600 can be configured to provide IPH 510 or 610 including: (a) a split core, and (b) one or more windings around the core, (B) a power Triode for Alternating Current (TRIAC) 520 or 620 connected across terminals of a given winding of the windings, and (C) a controller 530 or 630 connected to the power TRIAC 520 or 620, as detailed earlier herein, inter alia with reference to FIGS. 5 and 6 (block 704).

System 500 or 600 can also be configured to enable a current flow through the power TRIAC 520 or 620, using the controller 530 or 630, as detailed earlier herein, inter alia with reference to FIGS. 5 and 6 (block 708).

System 500 or 600 can be further configured to install IPH 510 or 610 and power TRIAC 520 or 620 on the live AC power line, wherein the power TRIAC 520 or 620 is configured to short the terminals of the given winding across which power TRIAC 520 or 620 is connected upon an accumulation of a turn-on voltage on a gate electrode of the power TRIAC 520 or 620, thereby nullifying a magnetic flux through the core of IPH 510 or 610 (block 712).

In addition, system 500 or 600 can be configured to disable the current flow through power TRIAC 520 or 620 upon a zero crossing point of the current through the given winding across which power TRIAC 520 or 620 is connected, using the controller 530 or 630, thereby enabling the IPH 510 or 610 to provide energy for an electrical load (block 716). The electrical load can be configured to include one or more devices.

It is to be noted that, with reference to FIG. 7, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method for limiting supply of energy from an Induction Power Harvester (IPH), the IPH being configured to provide energy for an electrical load, the method comprising:
    converting an alternating (AC) power signal that is generated across first and second terminals of a first winding of the IPH to a direct (DC) input signal, using an AC-to-DC converter, the AC-to-DC converter being connected to the first and second terminals; and
    generating a short circuit across third and fourth terminals of the IPH, using a shorting switch, thereby limiting the supply of energy from the IPH;
    wherein at least one of the first or second terminals is connected to the AC-to-DC converter and not connected to the shorting switch, thereby enabling a reduced current through the shorting switch, relative to an alternative configuration in which the first and second terminals are connected to the AC-to-DC converter and to the shorting switch.

2. The method of claim 1, wherein the short circuit is generated in response to the DC input signal being greater than or equal to a first threshold.

3. The method of claim 2, wherein the DC input signal is a DC voltage input signal.

4. The method of claim 2, further comprising:
removing the short circuit across the third and fourth terminals, in response to the DC input signal dropping below a second threshold, the second threshold being less than or equal to the first threshold, thereby enabling the supply of energy from the IPH to be resumed.

5. The method of claim 4, wherein the first threshold and the second threshold are fixed.

6. The method of claim 4, wherein at least one of the first threshold or the second threshold is variable.

7. The method of claim 6, further comprising:
converting the DC input signal to a storage signal, using a DC-to-DC converter, the storage signal being applied to at least one of: (a) an energy storage bank that is configured to store energy for powering the electrical load in accordance with the storage signal or (b) the electrical load;
wherein the at least one of the first threshold or the second threshold is varied in accordance with one or more of: a voltage level of the storage signal, a charge level of the energy storage bank, or power requirements of the electrical load.

8. The method of claim 1, further comprising:
converting the DC input signal to a storage signal, using a DC-to-DC converter, the storage signal being applied to an energy storage bank that is configured to store energy for powering the electrical load in accordance with the storage signal, wherein the short circuit is generated in response to a voltage level of the storage signal being greater than or equal to a third voltage or a charge level of the energy storage bank being greater than or equal to a first charge level; and
removing the short circuit across the third and fourth terminals, in response to the voltage level of the storage signal dropping below a fourth threshold or a charge level of the energy storage bank dropping below a second charge level, the fourth threshold being less than or equal to the third threshold and the second charge level being less than or equal to the first charge level, thereby enabling the supply of energy from the IPH to be resumed.

9. The method of claim 1, wherein the shorting switch is a power Triode for Alternating Current (TRIAC).

10. The method of claim 1, wherein the shorting switch is connected to a first tap of the first winding, such that the short circuit is generated across third and fourth terminals of the first winding, and the AC-to-DC converter is connected to a second tap of the first winding, the first tap including a larger number of turns of the first winding than the second tap, thereby enabling the reduced current through the shorting switch.

11. The method of claim 1, wherein the shorting switch is connected to a second winding of the IPH, different than the first winding, such that the short circuit is generated across third and fourth terminals of the second winding, thereby enabling the reduced current through the shorting switch.

12. A system for limiting supply of energy from an Induction Power Harvester (IPH), the IPH being configured to provide energy for an electrical load, the system comprising:

an AC-to-DC converter configured to convert an alternating (AC) power signal that is generated across first and second terminals of a first winding of the IPH to a direct (DC) input signal, the AC-to-DC converter being connected to the first and second terminals;
wherein the system is configured to generate a short circuit across third and fourth terminals of the IPH, using a shorting switch, thereby limiting the supply of energy from the IPH;
wherein at least one of the first or second terminals is connected to the AC-to-DC converter and not connected to the shorting switch, thereby enabling a reduced current through the shorting switch, relative to an alternative configuration in which the first and second terminals are connected to the AC-to-DC converter and to the shorting switch.

13. The system of claim 12, wherein the system is configured to generate the short circuit in response to the DC input signal being greater than or equal to a first threshold.

14. The system of claim 13, wherein the DC input signal is a DC voltage input signal.

15. The system of claim 13, wherein the system is configured to remove the short circuit across the third and fourth terminals, in response to the DC input signal dropping below a second threshold, the second threshold being less than or equal to the first threshold, thereby enabling the supply of energy from the IPH to be resumed.

16. The system of claim 15, further comprising:
a DC-to-DC converter configured to convert the DC input signal to a storage signal, the storage signal being applied to at least one of: (a) an energy storage bank that is configured to store energy for powering the electrical load in accordance with the storage signal or (b) the electrical load;
wherein at least one of the first threshold or the second threshold is varied in accordance with one or more of: a voltage level of the storage signal, a charge level of the energy storage bank, or power requirements of the electrical load.

17. The system of claim 12, further comprising:
a DC-to-DC converter configured to convert the DC input signal to a storage signal, the storage signal being applied to an energy storage bank that is configured to store energy for powering the electrical load in accordance with the storage signal, wherein the system is configured to generate the short circuit in response to a voltage level of the storage signal being greater than or equal to a third voltage or a charge level of the energy storage bank being greater than or equal to a first charge level; and
wherein the system is configured to remove the short circuit across the third and fourth terminals, in response to the voltage level of the storage signal dropping below a fourth threshold or a charge level of the energy storage bank dropping below a second charge level, the fourth threshold being less than or equal to the third threshold and the second charge level being less than or equal to the first charge level, thereby enabling the supply of energy from the IPH to be resumed.

18. The system of claim 12, wherein the shorting switch is a power Triode for Alternating Current (TRIAC).

19. The system of claim 12, wherein the shorting switch is connected to a first tap of the first winding, such that the short circuit is generated across third and fourth terminals of the first winding, and the AC-to-DC converter is connected to a second tap of the first winding, the first tap including a larger number of turns of the first winding than the second tap, thereby enabling the reduced current through the shorting switch.

20. The system of claim 12, wherein the shorting switch is connected to a second winding of the IPH, different than the first winding, such that the short circuit is generated across third and fourth terminals of the second winding, thereby enabling the reduced current through the shorting switch.

\* \* \* \* \*